US011845337B2

(12) United States Patent
Forte et al.

(10) Patent No.: US 11,845,337 B2
(45) Date of Patent: Dec. 19, 2023

(54) ELECTRIC HYBRID TRANSMISSION ARCHITECTURE FOR A WORK VEHICLE

(71) Applicant: CNH Industrial America LLC, New Holland, PA (US)

(72) Inventors: Michelantonio Forte, Modena (IT); Alberto Borghi, Carpineti (IT)

(73) Assignee: CNH Industrial America LLC, New Holland, PA (US)

( * ) Notice: Subject to any disclaimer, the term of this patent is extended or adjusted under 35 U.S.C. 154(b) by 177 days.

(21) Appl. No.: 17/432,043

(22) PCT Filed: Feb. 17, 2020

(86) PCT No.: PCT/EP2020/054116
§ 371 (c)(1),
(2) Date: Aug. 18, 2021

(87) PCT Pub. No.: WO2020/169539
PCT Pub. Date: Aug. 27, 2020

(65) Prior Publication Data
US 2022/0176802 A1    Jun. 9, 2022

(30) Foreign Application Priority Data

Feb. 18, 2019  (IT) .......................... 102019000002341

(51) Int. Cl.
*B60K 6/387*      (2007.10)
*B60K 6/48*       (2007.10)
(Continued)

(52) U.S. Cl.
CPC ............... *B60K 6/48* (2013.01); *B60K 6/387* (2013.01); *B60K 6/547* (2013.01); *B60K 17/28* (2013.01); *B60K 2006/4825* (2013.01)

(58) Field of Classification Search
CPC .......... B60K 6/48; B60K 6/387; B60K 6/547; B60K 6/46; B60K 6/40; B60K 6/36;
(Continued)

(56) References Cited

U.S. PATENT DOCUMENTS 6,048,289 A  *  4/2000  Hattori .................. B60W 10/06
477/3
7,140,461 B2 * 11/2006  Morrow ................. B60K 6/445
180/65.245

(Continued)

OTHER PUBLICATIONS

International Search Report and Written Opinion for International Application No. PCT/EP2020/054116 dated May 6, 2020 (12 pages).

*Primary Examiner* — Tisha D Lewis
(74) *Attorney, Agent, or Firm* — Rickard DeMille; Rebecca Henkel

(57) ABSTRACT

An electric hybrid transmission architecture for a work vehicle includes a first and a second electric motor, each of which is electrically connected to a source of electric power. The first electric motor is configured to provide a torque to a first input shaft by converting electric power received from the source of electric power. The second electric motor is configured to provide a torque to a second input shaft by converting electric power received from the source of electric power. The electric hybrid transmission architecture also includes an output shaft which is mechanically connected to at least one of the first and second input shafts by means of controllable engaging means. The source of electric power is a generator carried by an internal combustion engine of the work vehicle.

7 Claims, 2 Drawing Sheets

(51) Int. Cl.
*B60K 17/28* (2006.01)
*B60K 6/547* (2007.10)

(58) Field of Classification Search
CPC ............... B60K 17/28; B60K 17/356; B60K 2006/4825; B60Y 2200/92; Y02T 10/62
See application file for complete search history.

(56) References Cited

U.S. PATENT DOCUMENTS

| | | | | |
|---|---|---|---|---|
| 8,474,556 | B2* | 7/2013 | Wang | B60L 50/61 180/65.285 |
| 2010/0170732 | A1* | 7/2010 | Glaser | B60W 10/06 180/65.245 |
| 2010/0206100 | A1 | 8/2010 | Vyas et al. | |
| 2015/0274152 | A1 | 10/2015 | Jerwick | |
| 2019/0023544 | A1 | 1/2019 | Hegewald et al. | |

* cited by examiner

ELECTRIC HYBRID TRANSMISSION ARCHITECTURE FOR A WORK VEHICLE

CROSS REFERENCE TO RELATED APPLICATIONS

This application is a U.S. National Stage filing of International Application Serial No. PCT/EP2020/054116 entitled "ELECTRIC HYBRID TRANSMISSION ARCHITECTURE FOR A WORK VEHICLE," filed Feb. 17, 2020, which claims priority to Italian Application Serial No. 102019000002341, filed Feb. 18, 2019, each of which is incorporated by reference herein in its entirety for all purposes.

TECHNICAL FIELD

The present invention concerns a transmission architecture, in particular a diesel hybrid electric transmission architecture for heavy work vehicles, in particular off-road vehicles such as agricultural tractors.

BACKGROUND OF THE INVENTION

The vehicle industry tends more and more toward the electrification for traction purposes. However, passenger cars are really different with respect to heavy work vehicles such as tractors and therefore the related powertrains are totally different.

Besides the need for kinetic energy, tractors often need linear movement for actuators, such as, buckets, HPL, which are usually operated with hydraulic cylinders or powered to deliver torque at their Power Take Off (PTO) to drive implements or to deliver hydraulic power to drive actuation on implements. The movements and payloads of hydraulic actuators and PTOs cause another load for the combustion engine, and may demand high peak powers.

In addition, there is an enormous diversity and complexity in powertrains of off-road vehicles with respect to passenger vehicles. For instance, powertrains of off-road vehicles differ from road vehicles by their dimensions, power requirements, production amounts, emission regulations, and permanence of environmental conditions.

Traditionally, tractors have been built with a mechanical and a hydraulic powertrain. Conversely, a hybrid tractor powertrain can be realized in many different ways. In general, different combinations of mechanical, hydraulic and electrical power transfer components may come into question for the right choice of the drivetrain topology for a specific case. For example, series, parallel, series-parallel, and complex hybrid electric tractor architectures have been defined.

Therefore, the need is felt to provide a hybrid transmission architecture for tractors which is capable of fulfilling the power demand of various utilizers, within the frame of a serial hybrid electric architecture.

Aim of the present invention is to satisfy the above mentioned needs.

SUMMARY OF THE INVENTION

The aforementioned aim is reached by a transmission as claimed in the appended set of claims.

BRIEF DESCRIPTION OF DRAWINGS

For a better understanding of the present invention, a embodiments are described in the following, by way of a non-limiting example, with reference to the attached drawings wherein.

DETAILED DESCRIPTION OF THE INVENTION

Figure 1:
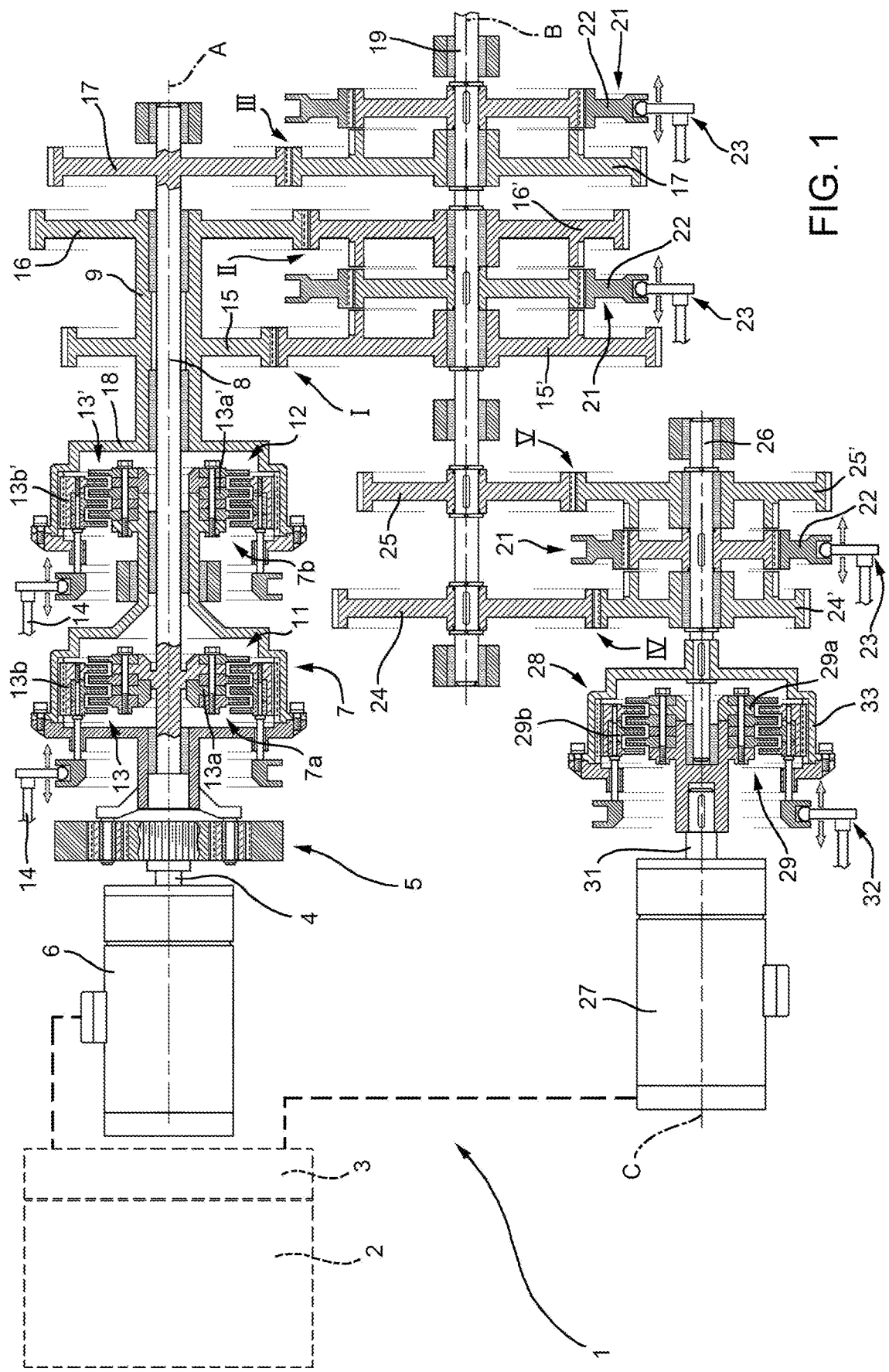
FIG. 1 is a schematic representation of a hybrid electric transmission architecture according to a first embodiment according to the present invention.

FIG. 1 discloses a hybrid electric transmission architecture 1 for a heavy vehicle such as an agricultural tractor provided with an engine 2, advantageously a diesel engine or an alternative fuel (for example liquefied natural gas) engine.

Engine 2 is configured to provide a torque to a generator 3 which is configured to convert the mechanical energy provided by engine 2 in electrical energy.

Transmission architecture 1 further comprises a first electric motor 6 configured to impart a torque to a first input shaft 4. First electric motor 6 is electrically connected to a source of power configured to provide a suitable quantity of power for operating motor 6. Advantageously such source of power is generator 3. In specific applications, for which the power demand is not high and the daily tractor mission is limited in time of usage, the use a battery pack in place of the generator 3 is preferred.

Input shaft 4 is coupled, to an opposite end with respect to the coupling with first electric motor 3, to a gearing 5 which connects input shaft 4 to a rotating housing 7. Rotating housing 7 is carried by a first intermediate shaft 8 in a rotatable free manner, e.g. via known bushings, and it is further connectable to a second intermediate shaft 9, preferably carried in a rotatable manner, e.g. via known bushings, on first intermediate shaft 8.

In particular, rotating housing 7, first and second intermediate shafts 8, 9 are all coaxial to an axis A of transmission 1. Preferably, also first input shaft 4 and gearing 5 are coaxial to such axis A. Rotating housing 7 comprises a first portion 7a configured to cooperate with first engaging means 11 configured to couple rotating housing 7 with first intermediate shaft 8 and a second portion 7b configured to cooperate with second engaging means 12 configured to couple rotating housing 7 with second intermediate shaft 9. According to the described exemplary embodiment, first portion 7a has a greater diameter around axis A than second portion 7b.

First and second engaging means 11, 12 may each comprise respective disk clutches 13, 13', preferably multiple disks clutches, actuated by respective driving device 14. Driving devices 14 may be of any typology, e.g. mechanic, electric or pneumatic.

In particular, clutch 13 may comprise a fixed portion 13a which is fixedly carried by first intermediate shaft 8 and a mobile portion 13b which is connected to driving device 14 and slidably cooperating with first portion 7a of rotating housing 7. In particular mobile portion 13b may cooperate with an inner gearing realized in first portion 7a, such gearing allowing a translational movement of mobile portion 13b along axis A while allowing a rotational coupling of rotating housing 7 with mobile portion 13b.

Clutch 13' may comprise a fixed portion 13a' which is fixedly carried by rotating housing 7 and a mobile portion 13b' which is connected to driving device 14 and slidably cooperating with second intermediate shaft 9. In particular mobile portion 13b' may cooperate with a gearing 18 carried by second intermediate shaft 9, such gearing 18 allowing a translational movement of mobile portion 13b' along axis A while allowing a rotational coupling of second intermediate shaft 9 with mobile portion 13b'.

According to the described embodiment second intermediate shaft 9 comprises two gears 15, 16 which are advantageously realized in a single body which second intermediate shaft 9.

In particular, gear 16 is positioned in substantially a terminal portion of second shaft 9 and gear 15 is positioned in an intermediate portion with respect to gear 16 and rotating housing 7. Advantageously gear 16 has a bigger diameter than gear 15.

According to the described embodiment first intermediate shaft 8 comprises a single gear 17 which is advantageously realized in a single body which first intermediate shaft 8. In particular, gear 17 is positioned in substantially a terminal portion of first shaft 8 and on the opposite side of gear 15 of second shaft 9 with respect to gear 16. Advantageously gear 17 has a diameter which is intermediate with respect to the diameter of gears 15 and 16.

Gears 15, 16 and 17 cooperate with respective gears 15', 16', 17' carried in a rotatably free manner by an output shaft 19. Gears 15, 15', 16, 16' and 17, 17' defined each other respective I, II and III gear ratios between input shaft 4 and output shaft 19, according to the pre-set dimensions of their diameters. Gears 15', 16', 17' may be carried by output shaft 19 thanks to known bearings and each may be selected thanks to dedicated engaging means 21 such as dog clutches 22. Such engaging means 21 may be controlled by a driving device 23, in known way.

Output shaft 19 rotates around an axis B which is preferably parallel with respect to axis A and, according to the described embodiment, further comprises a fourth gear 24 which is carried by output shaft 19 in a substantially terminal position of this latter opposite to the one carrying gears 15', 16' and 17'. Output shaft further comprises a fifth gear which is carried by output shaft 19 in an intermediate position between fourth gear 24 and gear 15'. Preferably fourth and fifth gears 24, 25 are fixedly carried by output shaft 19.

Fourth and fifth gears 24, 25 cooperate with respective gears 24', 25' carried in a rotatable free manner by a third intermediate shaft 26. Gears 24, 24' and 25, 25' define each other respective IV and V gear ratios between third intermediate shaft 26 and output shaft 19, according to the pre-set dimensions of their diameters. Gears 25', 26' may be selected thanks to dedicated engaging means 21 such as dog clutches 22. Such engaging means 21 may be controlled by a driving device 23, in known way.

Third intermediate shaft 26 rotates around an axis C which is preferably parallel with respect to axis A and B. Advantageously axis C is placed on the opposite with respect to axis A. Third intermediate shaft 26 is further selectively coupled to a second electric motor 27 via engaging means 28.

Second electric motor 27 is electrically connected to a source of power configured to provide a suitable quantity of power for operating motor 27. Advantageously such source of power is generator 3. In specific applications, for which the power demand is not high and the daily tractor mission is limited in duration, the use a battery pack is preferred in replacement of generator 3.

Engaging means 28 preferably comprises a clutch 29, more preferably a multiple disks clutch. In particular, clutch 29 comprise a fixed portion 29a which is fixedly carried by second input shaft 31 driven by second electric motor 27 and a mobile portion 29b, which is connected to a driving device 32 configured to control its movement, and slidably cooperating with a geared housing 33 carried by third intermediate shaft 26. In particular, mobile portion 29b may cooperate with an inner gearing realized in geared housing 33, such gearing allowing a translational movement of mobile portion 29b along axis C while allowing a rotational coupling of this latter with geared housing 33.

Hybrid transmission architecture 1 further comprises an electronic unit, not shown, electrically connected to first and second electric motors 6, 27 and configured to control their operation. Advantageously, electric control unit is further electrically connected to driving devices 14, 23 and 32 to control their operating status. Further, electronic unit may be connected to engine 2 and to generator 3 to control their operation. Preferably such electronic unit may be the ECU (Electronic Control Unit) of the tractor.

Figure 2:
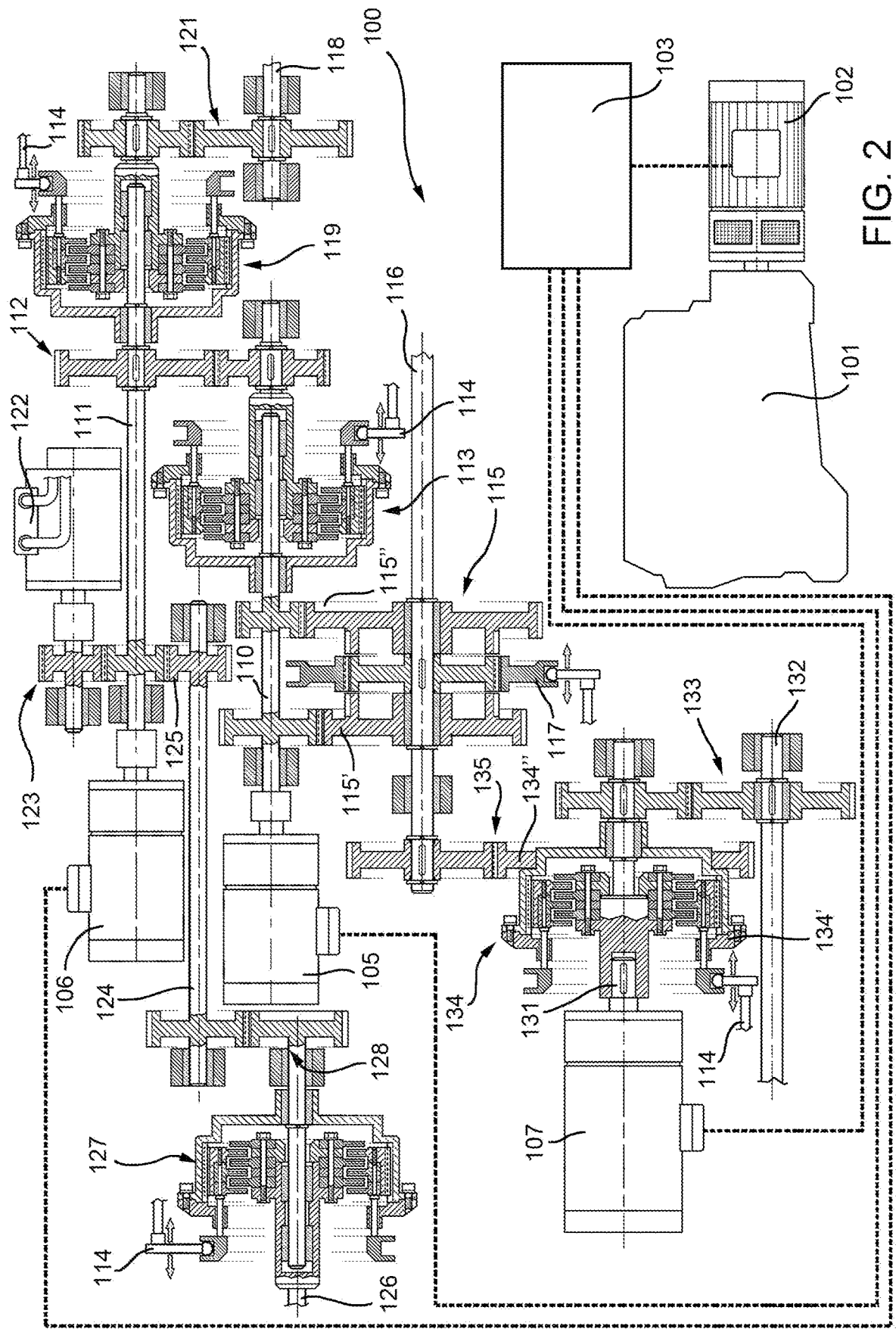
FIG. 2 is a schematic representation of a hybrid electric transmission architecture according to a second embodiment according to the present invention

FIG. 2 discloses a second embodiment of the hybrid electric architecture 100 according to the invention provided with an engine 101, advantageously a diesel engine or an alternative fuel engine.

Engine 101 is configured to provide a torque to a generator 102 which is configured to convert the mechanical energy provided by engine 101 in electrical energy which can be stored into an accumulator 103 as described in the following.

Accumulator 103 is electrically connected to three electric motors 105, 106, 107; indeed, generator 102 may deliver electric power directly to motors 105, 106, 107 or the electric energy can be also stored into the energy accumulator element 103. The energy accumulator 103 may be a battery pack or a supercapacitor or a more complex configuration as a battery with a supercapacitor in a parallel configuration.

First electric motor 105 is configured to impart a torque to a first input shaft 110. The first input shaft 110 is suitable to be coupled, at an opposite end with respect to the coupling with first electric motor 105, to a second shaft 111 thanks to a gearing 112 defining a preset first ration between first and second input shafts 110, 111.

Connection between first and second input shafts 110, 111 is realized selectively according to a clutch 113 mechanically interposed between first electric motor 105 and gearing 112 on first shaft 110. Clutch 113 may be actuated by a dedicated actuator 114 as described for the embodiment of FIG. 1.

First shaft 110 is furthermore connected thanks to a gearing 115 to a first output shaft 116, this latter being connected to rear axle of the vehicle. In particular, gearing 115 may comprise at least two different gearings 115', 115" between first input shaft 110 and first output shaft 116 realizing two different ratios between these latter, consequently realizing two different speed ranges of the transmission. Such gearings 115', 115" may be selected thanks to engaging means 117 such as dog clutches as described in the first embodiment. Indeed, as shown in FIG. 2, in the exemplarily described embodiment gearings 115', 115" comprises fixed gears on first input shaft 110 and rotatably free gears on first output shaft 116.

Second input shaft 111 may be driven by second electric motor 106 and is furthermore connectable to a rear power take off (PTO) shaft 118 via a clutch 119, controlled by dedicated actuator 114, and a gearing 121 defining an appropriate gear ratio.

Furthermore, second input shaft 111 is connected to a hydraulic oil pump 122 of the tractor, for example a variable displacement pump or fixed displacement pump, via a gearing 123 and to a second output shaft 124 via a gearing 125.

Preferably, according to the described configuration, gearings 123 and 125 share the same gear on input shaft 111. According to the disclosed configuration, all gears of gearings 121, 123 and 125 comprise gears which are fixedly carried by the respective shaft.

Second output shaft 124 is furthermore connected, at an opposite extremity with respect to the connection via gearing 125, to a front PTO shaft 126 via a clutch 127, controlled by dedicated actuator 114, and a gearing 128 defining an appropriate gear ratio. Preferably gears of gearing 128 are both fixedly carried by the respective shafts.

Third electric motor 107 is connected to a third input shaft 131 which is selectively coupled to a third output shaft 132 coupled to a front axle shaft of the vehicle via a gearing 133. In particular, third input shaft 131 is selectively coupled to third output shaft 132 via a clutch 134 controlled by dedicated actuator 114.

Furthermore, third output shaft 132 is connected to first output shaft 116 via a gearing 135; in particular such gearing 135 comprise a gear fixedly carried by one of housings 134', 134" comprised by clutch 134, i.e. a housing 134" coupled to the third output shaft 132 via a gearing 133.

Similarly, to the first embodiment, hybrid transmission architecture 100 further comprises an electronic unit, not shown, electrically connected to three motors 105, 106 and 107 and configured to control their operations. Advantageously, electric control unit is further electrically connected to driving devices 114, and 117 to control their operating status. Further, electronic unit may be connected to engine 101, to generator 102 and to accumulator 103 to control their operations. Preferably such electronic unit may be the powertrain control unit of the tractor or any electronic control unit of the tractor.

Thereinafter, the operation of hybrid transmission architecture 100 according to the above description will be described in several following ways, indicated as the typical working conditions of the tractor.

First it is noted that the electric motor 106, in all possible operating modes described in what follows, is always activated by its power electronics module and powered from the electric generator 102 or by the energy accumulator system 103. Indeed, the electric motor 106 has to drive the high pressure hydraulic pump 122 to use hydraulic power in general and maybe it has to drive a low pressure pump for some lubrication of the remaining mechanics. In alternative, not shown, the low pressure pump may be an electric pump, not powered by the electric motor 106 and powered directly by the generator 102, which is essential in an agricultural work vehicle such as a tractor.

Furthermore, in all the following working modes, it is clear that engine 101 produces mechanical energy which is converted in electrical energy by generator 102 and the energy provided to the at least one of motor 106, of motors 105, 106 and 107.

In a first operation mode, i.e. a field work low traction operating mode, in which low load traction effort is required, first electric motor 105 is controlled by the electronic unit so as to put in rotation the input shaft 110. The selection element 117 moves for engage gearing 115' corresponding to a first speed range of the transmission.

In this way, the motion and torque are transmitted by the shaft 110 to the first output shaft 116 and, then to rear axle shaft.

A second operation mode of the transmission 100 is a work high traction demand configuration, i.e. a configuration into which traction effort increases.

In this configuration, in addition to what already described for the first operative condition, third electric motor 107 is activated by its power electronic module and by the control unit. The torque generated by the third electric motor 107 drives the third input shaft 131; such torque can be delivered to the third output shaft 132 via the gearing 133 and then to front axle of tractor or to the rear axle via gearing 135, depending on the adherence condition encountered by the wheels on front and rear axles. In practice, a traction control logic may be implemented, by means of the clutch 134: if open, the torque drives directly the front wheels, being transferred from the shaft 131 to the shaft 132 by means of the gearing 133; conversely, if closed, then the torque passes to the front axle as described in the preceding and to the first input shaft 116 and, then, to rear axle via gearing 135, boosting the torque already in place on the rear axle for the action of first electric motor 105. In this latter case, the distribution of the torque generated by third electric motor 107 follows the effective (dynamic) weight distribution on the front and rear wheels. In particular, both second and third electric motors 106 and 107 may be used to compensate for the dynamic oscillations of the traction load, stabilizing the diesel engine 101 and avoiding the drop off of tractor ground speed; in fact, thanks to the torque capacity of the electric motors 106 and 107 it is possible to compensate the peaks of torque that are required by the vehicle It is noticeable that the architecture 107 always offers two electric motors for the over torque functionality for peak torque management. Indeed, such circumstance are very favorable to a more continuous action of the electric machines for torque compensation as they can be alternatively used for that task, doubling the time interval length at which they are asked to run in the unfavorable over torque. In other words, as the electric motors are not allowed to work at their peak power curves for more than 30 seconds or similar, having two motors that can alternate themselves in doing the same job at their peak power is an advantage. Thus, it is possible to provide peak power for the double of the time.

A third working mode of the transmission architecture 100 is a transportation at low load, in which the tractor is supposed to travel at high speed and with a limited traction effort, for example in an on-road out from the off-roads.

It is supposed that first electric motor 105 drives the first input shaft 110 as described for the first working mode, namely the field work low traction operating. Selection element 117 is engaged to gearing 115" (corresponding to a second speed range of the transmission) and therefore motion and torque are transferred from the first input shaft 110 to the first output shaft 116 and, then, to rear axle of tractor.

The passage from the first or second working mode to third working mode can be achieved by controlling and moving the selection element 117. The drive torque is held for a very short time by the third engine 107. In this way, selection element 117 can be moved freely from gearing 115' to gearing 115", since it is not more load or torque charged, and the electric motor 107 is generating the appropriate torque (and thus traction). Once the ratio 115" has been engaged, then the first electric motor 105 can be reactivated and again it can generate torque in turn, this will be called E-shift, the electric motor 107 may be deactivated and so an electronic shift can be commanded by switching the two motors, 105 and 107.

A fourth working mode of the transmission architecture 100 is a transportation at high load working mode.

In such configuration, second electric motor 106 will be asked to supply the extra torque to boost the traction.

Therefore, clutch 113 is engaged and the torque generated by second electric motor 106, driving second input shaft 111, is transferred to first input shaft 110 by means of the action of the gearing 112. The control unit makes consistent (in phase or speed matching) the summation of the torque generated by first and second motors 105, 106 on first input shaft 110.

A fifth operation mode of the transmission architecture 100 is a low load working mode, into which tractor is standstill and a limited PTO load (or a hydraulic load) is required.

In such configuration, second electric motor 106 is activated by the control unit and its power electronic module to generate on second input shaft a torque necessary to drive pump 122 by means of gearing 123. Alternatively, part of the torque may be used to drive the front PTO 126, by means of gearings 125 and 128; indeed, the activation of the front PTO 126 is achieved by engaging the clutch 127 thanks to the control of actuator 114. Alternatively, part of the torque can be used to drive the rear PTO 118, whose activation is ruled by engaging clutch 119 thanks to the dedicated actuator 114.

A sixth operation mode of the transmission architecture 100 is a high load working mode, into which tractor is standstill and an increased PTO load (or a hydraulic load) is required.

First electric motor 105 is activated by the control unit and its power electronic module and its torque is transferred on first input shaft 110. In such configuration, selection means 117 are in neutral position so the no torque is transmitted to first output shaft 116 and clutch 113 is engaged. Accordingly, torque is transmitted from first input shaft to second input shaft 111, by means of the gearing 112. Once again the control unit determines the coherence of the torque addition on second input shaft 111. In this way, an extra torque and power is available on second input shaft 111 to be distributed to the front 126 or rear PTO 118 and to the hydraulic pumps, to compensate the increased torque demand as described in the fifth operation mode.

A seventh operation mode of the transmission architecture 100 is a high PTO load and low tractor mode, which is typical of the field work operation in which a high PTO and hydraulic load is encountered, while a limited traction effort is requested.

In such configuration, second electric motor 106 is activated by the control unit and its power electronic module to generate part of the high torque requested from the PTOs and hydraulic, driving second input shaft as described in the preceding operation modes. The remaining part of the torque requested by the PTOs and hydraulics is generated by the first electric motor 105 on first input shaft 110, the first electric motor activated by the control unit and its power electronic module. Indeed, selection means 117 are in neutral position and clutch 113 is engaged, then the torque coming from the first electric motor 105 merges with the existing torque on the second input shaft 111 by means of gearing 112. The control unit ensures the addition of the in-phase torque. The total torque on second input shaft 111 may be used to drive Front PTO by the gearings 123 and 128 or Rear PTO by means of the gearing 121, or both simultaneously, depending on the engagement status of clutches 127 and 119 respectively.

Clutches 127 and 119 are preferably wet clutches, as there is the possibility in field usage to activate front or rear PTO when the other one is already running. All the preceding description is made in addition to driving the pump 122 by means of the gearing 123. The traction effort of the tractor will be managed by the third electric motor 107, that may drive consistently the front axle by means of gearing 133, or the front and rear axle by engaging the clutch 134 and delivering the torque to the first output shaft 116 via gearing 135, in case the tractor weight distribution loads more the rear axle.

An eight operation mode of the transmission architecture 100 is a low PTO load and high tractor mode, which is typical of the rough field work operation in which an high PTO and hydraulic load is encountered, while a high traction effort is requested.

In this working mode second electric motor 106 is activated by the control unit and its power electronic module to generate torque to drive second input shaft 111. The torque available is used to drive the hydraulic pumps 122 and one between rear or front PTO with limited torque demand. There is anyway the possibility to compensate for short time possible peak of torque requested at the PTO, by running over torque the second electric motor 106.

The high traction effort is managed by both first and third electric motors 105, 107. Indeed, the first electric motor rotates the first input shaft 110 and the selection element 117 is engaged with gearing 115'.

Therefore, the first gear ratio speed is activated and the torque generated by the first electric motor 105 is transmitted from the first input shaft 110 to the first output shaft 116. At the same time, also third electric motor 107 is active and it generates its part of the required traction torque to the third input shaft 131. As largely described above, this torque may be addressed to the front axle shaft 132, by means of the gearing 133, or to both front axle shaft 132 and rear axle shaft 116, by closing clutch 134 and allowing the weight dynamic distribution to decide about the real torque distribution between the two axles.

All the above mentioned working modes, apply also in rearward direction of the tractors, as they may be selected in both the directions, as their occurrence depends only on the direction of rotation of the electric motors and therefore they are not described in full for sake of brevity. In view of the foregoing, the advantages of a hybrid transmission architecture 1, 100 according to the invention are apparent.

Indeed, it is possible to obtain a compact, economic and versatile hybrid transmission which can be used for a heavy tractor for driving this latter from 0 km/h to the maximum allowed speed, i.e. about or greater than 60 km/h.

Moreover, it is possible to provide a very high level of comfort for the operator similar to the one experienced in CVT system and even in all possible operating conditions.

The disclosed hybrid transmission architecture offers advantages for the efficiency, as it allows for a decoupling of the combustion engine speed from the speed of the various power utilizers.

In favor of the efficiency is also the fact that the power is divided over different electric motors and each one can work at his best point on its efficiency map even at partial load, where usually the combustion engine is very inefficient.

As the total torque at output shafts 19, 116, 132 is provided by dividing this latter between the different electric motors and the respective mechanical paths, it is possible to reduce the overall size of components, thereby decreasing dimensions, complexity, costs and weight of the of the mechanics necessary to the hybrid transmission architecture 1,100.

As the electric machines may works in their over torque region for a while, this offers the effective possible to handle peak of torque in traction effort and in PTO work. Therefore, the power density of the transmission looks increased.

Further, the torque provided at output shafts may be modulated according to user's necessities, providing at least the following advantages to the user:

improved productivity, as the architecture allows for pulling bigger implements and for faster speed in field operation. Also in favor of the productivity, is the lack of ground speed oscillation while working in field and the opportunity of introducing a traction control to increase the tractive efficiency of the tractor;

fuel saving, as combustion engine may be optimized in terms of working point for fuel efficiency in each tractor operation, as its speed is almost independent from the speeds of the possible power utilizers onboard to the tractor. In addition, the diesel engine speed may be stabilized, making significant reduction of the need for dynamic transient behavior of the engine, that is a fuel demanding;

the independent traction exerted by the motor 16 on the front axle wheels makes possible a reduction of the turning radius of the tractor, as the front axle wheel speed can be driven with no dependence on the rear axle wheel speed of the tractor; and it is gained flexibility in the usage of the tractor PTOs, as the PTOs driving system is make totally independent from the tractor ground speed.

Moreover, no creeper stage is needed because of the use of electric motors which starts to provide torque at very low ground speed. The modifications can be made to the described hybrid transmission architectures 1, 100 which do not extend beyond the scope of protection defined by the claims.

E.g. the described layout and elements such as PTO, clutches, selection means are not limitative and that the possible working mode described above are not exhaustive of all possible working modes which can be achieved by a selective activation of all the aforementioned elements.

The invention claimed is:

1. An electric hybrid transmission architecture for a work vehicle, the transmission architecture comprising:
    a first electric motor electrically coupled to a source of electric power and configured to provide a torque to a first input shaft by converting electric power received from the source of electric power;
    a second electric motor electrically coupled to the source of electric power and configured to provide a torque to a second input shaft by converting electric power received from the source of electric power;
    a third electric motor electrically coupled to the source of electric power and configured to provide a torque to a third input shaft by converting electric power received by the source of electric power;
    a hydraulic oil pump mechanically coupled to the third input shaft such that the hydraulic oil pump is configured to be driven by the third electric motor;
    a first power take off (PTO) shaft configured to provide torque to an implement coupled to the work vehicle;
    a first output shaft;
    a plurality of controllable engaging mechanisms comprising:
        a first controllable engaging mechanism configured to selectively couple the first PTO shaft to the third input shaft such that the first PTO shaft is configured to be driven by the third electric motor;
        a second controllable engaging mechanism configured to selectively couple the first output shaft to at least one of the first or the second input shaft such that the first output shaft is configured to be driven by at least one of the first or the second electric motor; and
    wherein the source of electric power is a generator carried by an internal combustion engine of the work vehicle.

2. The electric hybrid transmission architecture according to claim 1, further comprising:
    a second output shaft;
    the plurality of controllable engaging mechanisms further comprising:
        a third controllable engaging mechanism configured to selectively couple the second output shaft to the first and second input shafts.

3. The electric hybrid transmission architecture according to claim 1, further comprising an accumulator configured to be charged by the generator and electrically interposed between the generator and the first and second electric motors.

4. The electric hybrid transmission architecture according to claim 1, wherein at least one controllable engaging mechanism of the plurality of controllable engaging mechanisms comprises a friction disk clutch.

5. The electric hybrid transmission architecture according to claim 1, wherein at least one controllable engaging mechanism of the plurality of controllable engaging mechanisms comprises a dog clutch.

6. The electric hybrid transmission according to claim 1, further comprising a control electric unit electrically connected to the first and second electric motors, the control electric unit being configured to control the torque provided by the first and second electric motors.

7. The electric hybrid transmission architecture according to claim 6, wherein the control electric unit is further configured to control the plurality of controllable engaging mechanisms.

* * * * *